(12) United States Patent
Bracque et al.

(10) Patent No.: US 6,202,305 B1
(45) Date of Patent: *Mar. 20, 2001

(54) METHOD OF CONSTRUCTING A LARGE ELONGATE FLUID-CONFINING INTERNAL STRUCTURE SURROUNDED BY AN EXTERNAL STRUCTURE

(75) Inventors: Gilles Bracque, Saint Leu d'Esserent; Jean-Louis Perisse, La Varenne, both of (FR)

(73) Assignee: L'Air Liquide Societe Anonyme pour l'Etude et l'Exploitation des Procedes Georges Claude, Paris Cedex (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 17 days.

(21) Appl. No.: 09/170,064

(22) Filed: Oct. 13, 1998

(30) Foreign Application Priority Data

Oct. 14, 1997 (FR) .................................................. 97 12841
Oct. 24, 1997 (FR) .................................................. 97 13380

(51) Int. Cl.[7] .................................................. B23P 19/00
(52) U.S. Cl. .......................... 29/897; 29/897.312; 29/469
(58) Field of Search .............................. 29/897, 897.312, 29/464, 466, 468, 469, 525.14, 237, 282, 791, 795

(56) References Cited

U.S. PATENT DOCUMENTS

| | | | | |
|---|---|---|---|---|
| 1,910,138 | * | 5/1933 | Hooydonk | 29/468 |
| 2,167,338 | * | 7/1939 | Murcell | 29/468 |
| 2,720,694 | * | 10/1955 | Hines | 29/468 |
| 3,688,840 | * | 9/1972 | Curington et al. | 285/25 |
| 3,750,413 | | 8/1973 | Milligan et al. . | |
| 4,141,130 | * | 2/1979 | Hart et al. | 29/407 |
| 4,209,891 | * | 7/1980 | Lamb et al. | 29/466 |
| 4,259,776 | * | 4/1981 | Roda | 29/466 |
| 4,295,526 | * | 10/1981 | Hauk et al. | 29/464 |
| 4,462,535 | * | 7/1984 | Johnston et al. | 29/469 |
| 4,547,096 | * | 10/1985 | Daigle et al. | 29/464 |
| 4,556,342 | * | 12/1985 | Tannahill | 29/469 |
| 5,345,677 | * | 9/1994 | Cook, Jr. | 29/464 |
| 5,657,526 | * | 8/1997 | Yatcko | 29/416 |

FOREIGN PATENT DOCUMENTS

| | | |
|---|---|---|
| 32 48 345 | 6/1984 | (DE) . |
| 2 692 663 | 12/1993 | (FR) . |

* cited by examiner

*Primary Examiner*—J. Cuda
*Assistant Examiner*—Trinh Nguyen
(74) *Attorney, Agent, or Firm*—Young & Thompson

(57) ABSTRACT

In this method of constructing a composite structure with an internal structure surrounded by an external structure, plural composite modules are constructed by joining, for each of the modules, a section (1) of the internal structure to a corresponding section (5) of the external structure. The modules are joined together on site in order to form the composite structure.

1 Claim, 3 Drawing Sheets

METHOD OF CONSTRUCTING A LARGE ELONGATE FLUID-CONFINING INTERNAL STRUCTURE SURROUNDED BY AN EXTERNAL STRUCTURE

BACKGROUND OF THE INVENTION

The present invention relates to a method of constructing a large elongate internal structure surrounded by an external structure, the internal structure being a fluid-confining structure intended to form at least part of a fluid supply plant.

The invention applies more particularly to the construction of air-distillation columns, whose height may be as much as 60 meters, surrounded by their support frameworks.

On a production site, such a column, the verticality of which must be perfect in order to ensure that the distillation process is carried out properly, is surrounded by a framework which supports the column and all or some of its items of equipment, the framework being covered with external protective metal sheeting.

In the case of large distillation columns, i.e. the size of which does not allow them to be transported, the column and its framework have hitherto been constructed or delivered separately on site and then all or part of the framework, into which the column is subsequently inserted, is erected. Such a method of construction is complex and poses many problems when assembling the framework, the column and its items of equipment, especially in order to meet the verticality constraint imposed on the column.

Such a method of construction also poses problems of safety, in particular because of the heights at which workers may be required to operate.

SUMMARY OF THE INVENTION

The object of the invention is to remedy the abovementioned problems and, in particular, to provide a method of constructing a large internal structure surrounded by an external structure, allowing, on the one hand, rapid on-site assembly, meeting the column verticality constraint, and allowing, on the other hand, factory preassembly before transportation to the site.

For this purpose, the subject of the invention is a method of constructing a large elongate internal structure surrounded by an external structure, the internal structure being a fluid-confining structure intended to form at least part of a fluid supply plant, characterized in that n modules are constructed, for each of the modules, by joining a section of the internal structure to a corresponding section of the external structure, these n modules being intended to be joined together on site in order to form the internal structure surrounded by the external structure.

According to particular embodiments, the method may comprise one or more of the following characteristics:
  at least one internal structure section is introduced into the corresponding external structure section by pulling it in, especially by moving it along rails provided in the external structure section, which lies approximately horizontally, and then these two sections are fastened together;
  each internal structure section is introduced into and then positioned in the corresponding external structure section, in an identical manner and parallel to a predetermined longitudinal axis of the external structure, before these two sections are fastened together;
  the ends of external and internal structure sections are provided respectively with means for guiding adjacent sections and, after the internal structure section has been positioned with respect to the external structure section of a first module and after these two sections have been fastened together, for an adjacent module:
    the internal structure section is introduced into the corresponding external structure section,
    the internal structure section and the external structure section of the adjacent module are placed, by virtue of the respective guiding means, in the extension of the internal structure section and of the external structure section of the first module, respectively,
    the two external structure sections are aligned, and
    the internal structure section of the adjacent module is positioned with respect to its external structure section and these two sections are fastened together;
  when the corresponding modules are placed one in the extension of the other, at least two adjacent internal structure sections are equipped with at least some of their items of equipment before these modules are separated;
  for each module, the construction is completed by fitting protective metal sheeting over the corresponding external structure section, except at least in the regions of connection to the other modules;
  the internal structure is a distillation column;
  the external structure is a support frame-work;
  the n modules are joined together in succession, from the bottom module up to the top module, in order to erect the internal structure on site;
  since it is necessary to check on site the verticality of the internal structure:
    the bottom module is positioned in such a way that the longitudinal axis of the corresponding external structure section is vertical, and
    the following modules are assembled in succession on top of the bottom module;
  since it is necessary to check on site the verticality of the internal structure, at least one internal structure section is temporarily disconnected from the external structure section of an erected module in order to check the verticality of the internal structure section; and
    the equipping of the internal structure is completed, especially by connecting the items of equipment of the adjacent internal structure sections, and
    the fitting of the protective metal sheeting is completed.

BRIEF DESCRIPTION OF THE DRAWINGS

The invention will be more clearly understood on reading the description which follows, given solely by way of example and with reference to the appended drawings, in which.

DESCRIPTION OF THE PREFERRED EMBODIMENTS

Figure 1A:
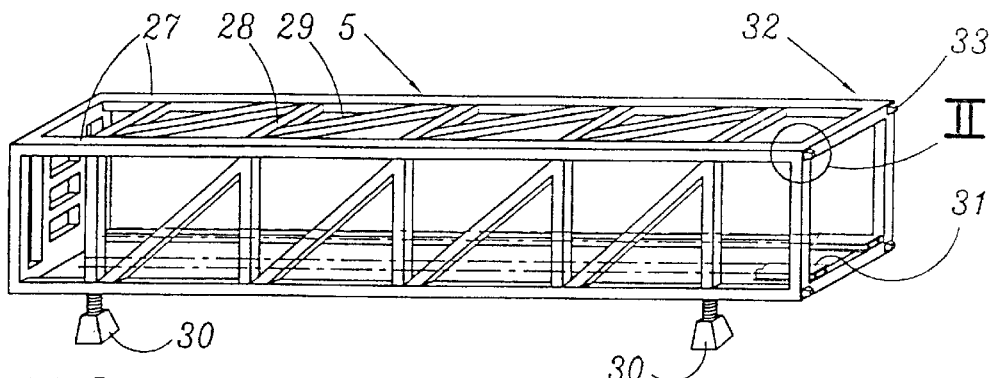
FIGS. 1A to 1D are diagrammatic perspective views of two halves of a large air-distillation column (FIGS. 1B and 1D) and of two halves of its framework (FIGS. 1A and 1C), these being constructed in order to implement the method of construction according to the invention.
Figure 1B:
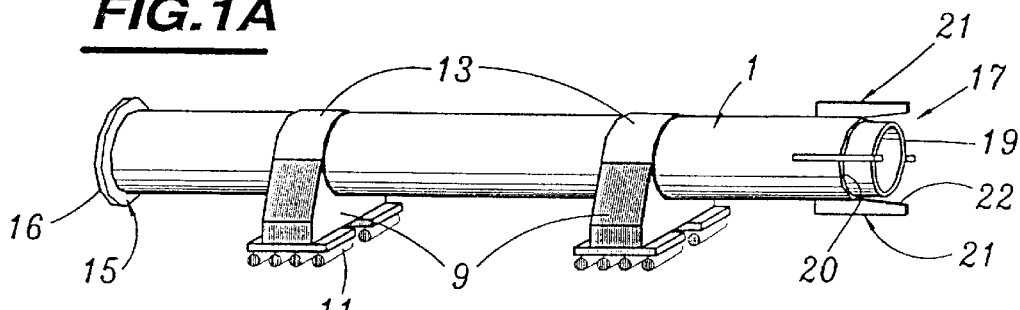

FIGS. 1A to 1D show diagrammatically two sections of an air-distillation column approximately 60 metres in length and two sections of its framework, these being constructed for the purpose of implementing the method of construction according to the invention.

A bottom half 1 and a top half 3 of an air-distillation column, of cylindrical general shape, and the corresponding bottom half 5 and top half 7 of its framework, of parallelepipedal general shape, are placed approximately horizontally in a workshop.

Each column half 1 and 3 rests on two spaced-apart transverse support cradles 9, the longitudinal positions of which with respect to each column half are as described later. These cradles 9 are provided with runners 11 having rollers with axes approximately orthogonal to the longitudinal axes of each column half. A metal protective belt 13 goes around each column half at each cradle 9.

The column half 1 (FIG. 1B), which comprises the medium-pressure part and the reboiler, which are not detailed in the figures, is extended, at its lower end (to the left in FIG. 1), by a cylindrical fixing skirt 15 terminating in an annular fixing flange 16. The column half 1 comprises, at its upper end, means 17 for guiding the top half 3.

These guiding means 17 comprise, on the one hand, an internal sleeve 19 welded to the upper edge 20 (to the right in FIG. 1) of the half 1 and projecting from this edge and, on the other hand, four radial tabs 21 fixed, for example by welding, at regular intervals to the external surface of the half 1. These tabs 21 each comprise a part which projects longitudinally from the upper edge 20. This projecting part has an internal guiding surface 22 which is radially inclined towards the outside, moving longitudinally away from the half The column half 3 (FIG. 1D) is provided near its upper end (to the right in FIG. 1D) with two symmetrical fixing tabs 23 which are transverse with respect to the longitudinal axis of the half 3. These tabs 23 each have a hole 25 whose axis is parallel to the said longitudinal axis.

The framework (FIGS. 1A and 1C) is a metal frame comprising four longitudinal stanchions 27 connected, on each face of the framework, by cross-members 28 and diagonal braces 29. The two framework halves 5 and 7 each rest on four height-adjustable feet 30. Longitudinal rails 31 are placed on the internal surface of the bottom face (in FIGS. 1A and 1C) of each framework half 5 and 7.

The upper end (to the right in FIG. 1A) of the framework half 5 is provided with means 32 for guiding the framework half 7. These guiding means 32 are composed of four truncated pyramids 33 which longitudinally extend each bottom half or section of longitudinal stanchion 27.

Figure 1C:
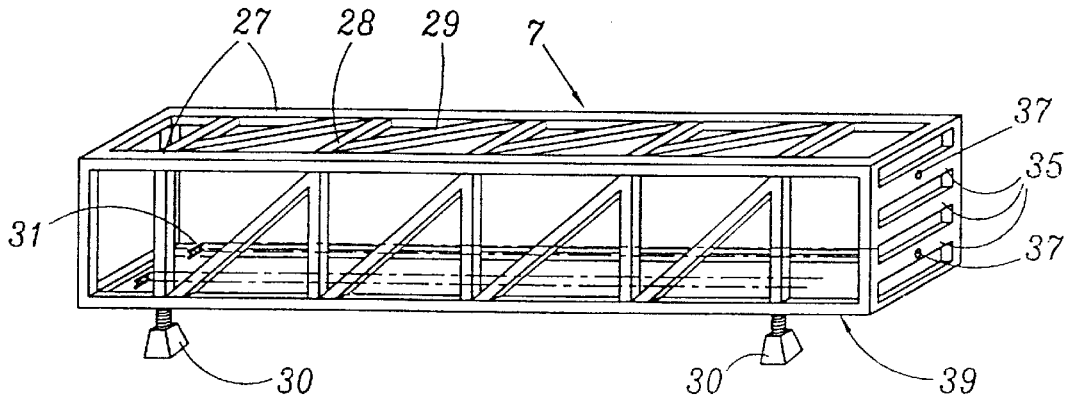
Figure 1D:
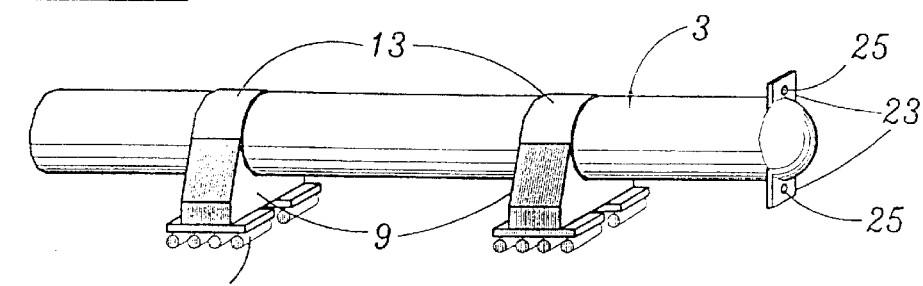
Figure 2:
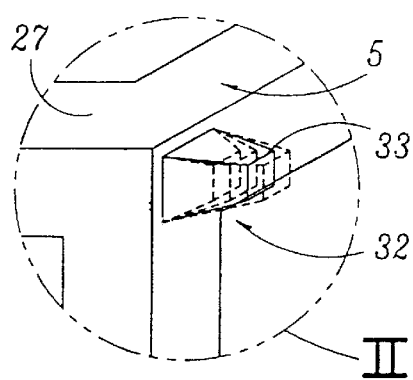
FIG. 2 is a diagrammatic view on a larger scale of the circled part II in FIG. 1A.

As shown diagrammatically in FIG. 2, these truncated pyramids 33 differ in size. Typically, a first truncated pyramid has a length (as seen in FIG. 2) of 200 mm, a second has a length of 150 mm and the two others have a length of 100 mm. Conjugate openings, not visible in FIG. 1C, are made on the inside of the lower ends (to the left in FIG. 1C) of the bottom halves or sections of the longitudinal stanchions 27 of the half 7.

The top face (to the right in FIG. 1C) of the framework half 7 comprises three approximately horizontal cross-members 35. The bottom and top cross-members 35 are provided with central holes 37 whose axes are parallel to the longitudinal axis of the half 7.

The bottom of the framework half 5 (to the left in FIG. 1A) is provided with vertical and horizontal cross-members which delimit, internally to the framework, a region for fixing the annular flange 16 of the skirt 15.

The column half 1 and the framework half 5 are joined together to form a first module, as described below.

First of all, it is ensured that the longitudinal axis of the framework half 5 is horizontal by adjusting the height of the feet 30. This positioning may be checked by using levels or another technique conventional to those skilled in the art.

Next, the column half 1 is introduced into the framework half 5, by pulling it in by means of a winch 47 connected by a cable to the lower end (to the left in FIG. 3) of the half 1, the runners 11 being made to run along the rails 31.

Figure 3:
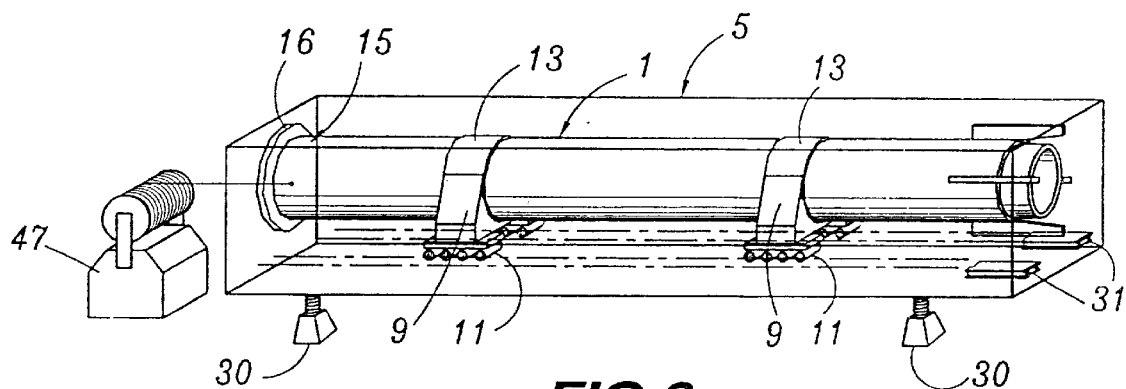
FIG. 3 is a diagrammatic perspective view illustrating the bottom half of the column being pulled into the bottom half of the framework in order to form a module.

The column half 1 is placed longitudinally in the framework half 5 in such a way that the two cradles 9 are each opposite the cross-members of each of the large faces of the half 1 and in such a way that the skirt 15 is a few millimetres from the cross-members of the bottom of the half 5 (to the left in FIG. 3). The longitudinal positions of the cradles 9 with respect to the column half 1 were therefore chosen, by carrying out simple measurements, to obtain this result.

Five screw jacks 49 are then placed at each cradle 9, i.e. ten jacks in total between the framework half 5 and the column half 1.

Figure 4:
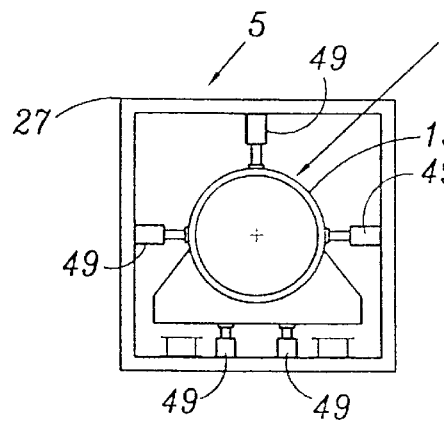
FIG. 4 is a diagrammatic end view of the module in FIG. 3, illustrating how the bottom half of the column is positioned in the bottom half of the framework.

As illustrated in FIG. 4, for each cradle 9, a vertical jack 49 is placed between the half 1 and a cross-member of the top (in FIG. 4) large face of the framework half 5, and two horizontal jacks are each placed between the column half 1 and a cross-member of a large side face of the framework half 5. The internal ends of these three jacks 49 bear on and are welded to the belt 13 which goes around the half 1, and their external ends are fixed to the associated cross-members of the half 5.

Two vertical jacks 49 are also placed between the bottom face of the cradle 9 and a cross-member (in FIG. 4) of the large bottom face of the framework half 5. Their upper ends are fixed to the cradle 9 and their lower ends to the framework half 5. Next, the runners 11 are removed from under the two cradles 9 of the column half 1, as shown in FIG. 4.

Next, the half 1 is positioned with respect to the half 5 so that their longitudinal axes are parallel and so that they adopt a chosen and defined relative position. This relative position may be defined by a sighting device or by using another technique conventional to those skilled in the art.

This relative position may be modified by adjusting the jacks 49. Preferably, it is such that the half 1 lies approximately in a central position in the half 5.

Once the relative positioning of the halves 1 and 5 has been completed, these two halves are fastened together, for example by spot-welding the nuts of the jacks 49.

Figure 5:
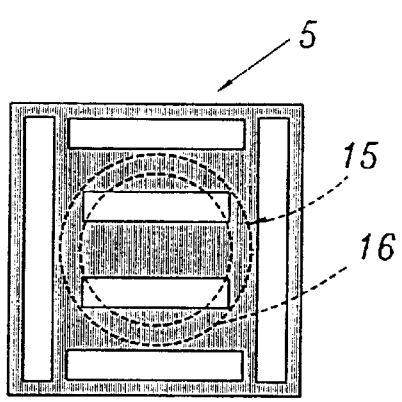
FIG. 5 is another diagrammatic end view of the module in FIG. 3, illustrating how the skirt of the bottom half of the column is fixed to half of the corresponding framework.

The annular flange 16 of the skirt 15 is then welded, all around its circumference, as shown diagrammatically in FIG. 5, to the cross-members of the bottom of the framework half 5 in order to complete the fastening of the halves 1 and 5.

The framework half and the column half of the first module are then positioned and fixed one with respect to the other.

The relative positioning of the top column half 3 in the top framework half 7, in order to assemble the second module, is carried out as follows.

Figure 6:
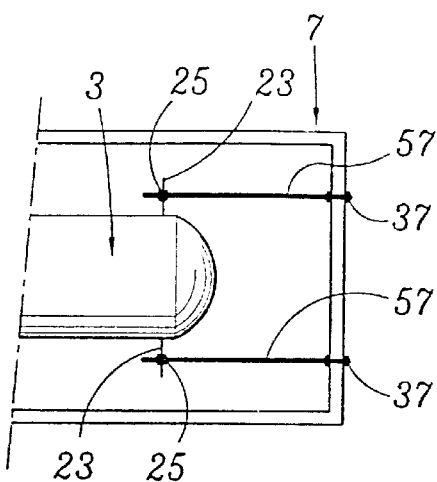
FIG. 6 is a diagrammatic side view illustrating the connection between the top half of the column and the top half of the framework.

The horizontality of the framework half 7 is checked, in a manner similar to that used for the framework half 5, and then the column half 3 is pulled into the framework half 7 as described for the first module. Ten screw jacks 49 are placed in a similar manner to that described for the bottom module and a rod 57 (FIG. 6) is mounted, by means of nuts, between each tab 23 of the half 3 and the facing cross-member 35 of the half 7.

Each rod 57 passes through a hole 25 and a hole 37, and nuts fasten one of their ends to the corresponding tab 23 and the other end to the corresponding cross-member 35.

Relative prepositioning of the respective longitudinal axes of the half 7 and of the half 3 may then be carried out, possibly using a technique similar to that used for the first module.

Next, using the guiding means 17 and 32, the top halves 3 and 7, respectively, are placed in the extension of the bottom halves 1 and 5. To do this, on the one hand the truncated pyramids 33 are inserted into the conjugate openings in the top halves of the stanchions 27, this being accomplished in decreasing order of length (as seen in FIG. 2) of the truncated pyramids, and on the other hand the sleeve 19 is inserted into the bottom part (to the left in FIG. 1) of the column half 3 so as to leave a clearance of a few millimetres between the facing ends of the top and bottom, column and framework halves. The rods 57 and their nuts enable the distance between the two column halves to be adjusted.

The alignment of the halves 5 and 7 is then checked by means of a sighting device, or by using another technique conventional to those skilled in the art, and by adjusting the height of the feet 30 supporting the framework half 7.

Next, the column half 3 is positioned in the framework half 7 in a manner similar to that used for the first module, in such a way that the longitudinal axis of the half 3 is parallel to the longitudinal axis of the half 7 and in such a way that the relative coordinates of these two axes are the same as the relative coordinates of the corresponding two axes of the first module.

Once this positioning operation has been completed, the column half 3 and the framework half 7 are definitively fastened together, for example by spot-welding the nuts of the jacks 49 and of the rods 57.

Figure 7:
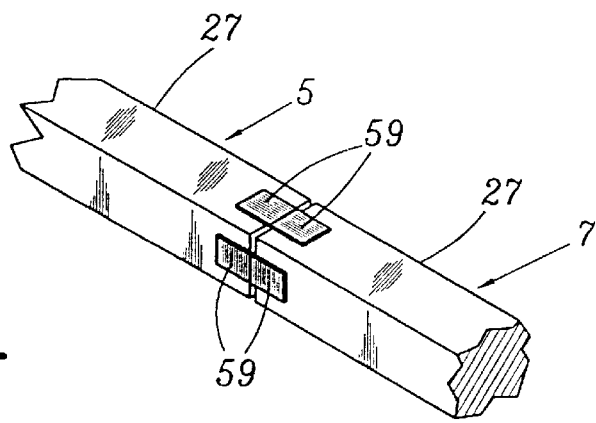
FIGS. 7 and 8 are diagrammatic perspective views illustrating the fitting of flat plates on to the longitudinal stanchions of the framework and on to the column, respectively.
Figure 8:
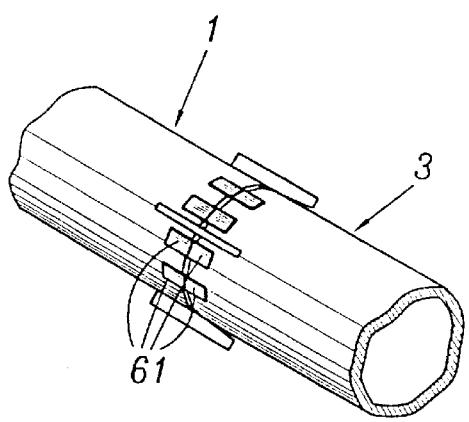

Flat metal plates are then welded to the facing ends of the two column halves and of the two framework halves in order to freeze the relative adjustment of the top and bottom modules. Thus, each half of a longitudinal stanchion 27 (FIG. 7) carries flat plates 59 at the ends, internal to the framework, of its longitudinal faces external to the framework. The external surface of each column half receives eight flat plates 61 (FIG. 8) distributed in a regular manner at its end adjacent to the other column half. The flat plates 59 and 61 of the top and bottom modules are arranged so as to face one another. Each flat plate 59 and 61 has a part which projects longitudinally with respect to the element of the module to which it is fixed, one edge of which bears on an edge of the facing flat plate fixed to the other module.

The column sections have therefore been fixed, in an identical manner for the bottom module and then for the top module, with respect to the longitudinal axis of the framework, with the axis of each column section parallel to the axis of the corresponding framework section.

Next, the column half 1 and then the column half 3 are equipped, by fitting the respective instrumentation devices and piping.

Since the top and bottom modules are aligned, those parts of these items of equipment which are close to the facing ends of the two modules are fitted while ensuring that they are aligned, for example by using temporary connection sleeves.

For each module, the protective metal sheeting is fitted, except at least in the connection parts of the two modules, and then the two modules are unfastened, for example by using jacks.

Means for protecting the open ends of the column, its items of equipment and its framework, for example water-tight covers, are then used.

The top and bottom modules are then ready to be transported to an industrial site. The length of these modules, which is less than 30 m, allow them to be transported by conventional means.

These modules are assembled on site as described below.

The bottom module is erected, by placing the bottom of the framework half 5 (to the left in FIG. 1A) on height-adjustable feet placed, for example, at the four corners of the framework bottom. The verticality of the longitudinal axis of the framework half 5 is then checked, for example by means of a sighting device or any other technique conventional to those skilled in the art.

Since the longitudinal axis of the column half 1 is parallel to the longitudinal axis of the framework half 5, the verticality of the column half 1 is easily checked, by modifying the respective height of the feet on which the framework half 5 rests.

The setting of the bottom module with respect to the ground of the industrial site is then frozen, and then, for example using cranes, the top module is placed on top of the bottom module, guiding the bottom part of the top module (to the left in FIG. 1C) using the guiding means 17 and 32. The truncated pyramids 33 are then inserted in succession, proceeding by decreasing lengths, into the conjugate openings in the longitudinal stanchion halves 27 of the framework half 7 and by inserting the sleeve 19 into the column half 3.

By bringing the flat plates 61 and 59 of the top and bottom modules into contact with each other, the factory presetting is re-established, thus ensuring that there is proper alignment of the two column halves. The longitudinal axis of the column therefore lies vertically.

The column halves 1 and 3 and the framework halves 5 and 7 are then welded together, filling the few millimetres provided between the top and bottom modules with a weld bead. The items of equipment for the bottom module and the top module are connected and then the fitting of the protective metal sheeting is completed.

The method according to the invention therefore allows factory preassembly of a large distillation column and its framework into transportable modules and allows, on site, rapid vertical assembly meeting the verticality constraints imposed on distillation columns.

The construction of each module may also be carried out directly on site.

According to a simplified variant, it is possible, after the column halves 1 and 3 have been pulled into the framework halves 5 and 7, respectively, for the column halves 1 and 3 to be temporarily fixed in the framework halves 5 and 7 after relative positioning which is less precise than in the previous method of construction. These are then disconnected on site, in order to check the verticality of each column half of an erected module, before they are finally fastened together.

Thus, it is possible to erect the first module, to disconnect the bottom halves 1 and 5, to check the verticality of the column half 1, to fasten the bottom halves 1 and 5 in a definitive manner, then to place the second module on top of the first and to carry out the operation in a manner similar to the latter.

It is also possible firstly to place the second module on the erected first module and then to carry out the operations of column half/framework half disconnection, column-half vertical positioning and column half/framework half definitive fastening for both modules.

In other variants, it is also possible to pre-equip the column halves 1 and 3 and/or the framework halves 5 and 7 before the column halves 1 and 3 are introduced into the framework halves 5 and 7.

What is claimed is:

1. A method of constructing an elongate composite structure having an elongate internal fluid confining structure for a fluid supply plant surrounded over substantially its entire length by an external structure, the method comprising the steps of:

separately constructing at least two composite modules, each of the modules being constructed by joining a section of the internal structure to a corresponding section of the external structure;

removably joining together the at least two composite modules by joining the sections of the internal structure to each other and by joining the sections of the external structure to each other;

separating the removably joined composite modules and transporting the separate composite modules to a site where the composite structure is to be erected; and erecting the composite structure at the site by vertically erecting a bottom one of the composite modules and joining a further one of the composite modules thereto by fluid-tightly and non-removably joining the sections of the internal structure to each other and by joining the sections of the external structure to each other to form the elongate composite structure on the site.

* * * * *